(12) United States Patent
Janak et al.

(10) Patent No.: US 8,933,244 B2
(45) Date of Patent: Jan. 13, 2015

(54) STABILIZED ACTIVE HALOGEN SOLUTIONS

(75) Inventors: Kevin E. Janak, Ossining, NY (US); Sarah Elizabeth Kopecky, Monroe, NY (US); Michael Leonid Ludensky, Randolph, NJ (US); Philip Gerdon Sweeny, Hackettstown, NJ (US)

(73) Assignee: Lonza Inc., Visp (CH)

( * ) Notice: Subject to any disclaimer, the term of this patent is extended or adjusted under 35 U.S.C. 154(b) by 0 days.

(21) Appl. No.: 13/384,923

(22) PCT Filed: Jul. 26, 2010

(86) PCT No.: PCT/EP2010/004568
§ 371 (c)(1),
(2), (4) Date: Jan. 19, 2012

(87) PCT Pub. No.: WO2011/012279
PCT Pub. Date: Feb. 3, 2011

(65) Prior Publication Data
US 2012/0114632 A1   May 10, 2012

Related U.S. Application Data

(60) Provisional application No. 61/228,778, filed on Jul. 27, 2009.

(51) Int. Cl.
*A61K 31/433* (2006.01)
*C07D 233/32* (2006.01)
*C02F 1/50* (2006.01)
*C02F 1/76* (2006.01)

(52) U.S. Cl.
CPC ... *C02F 1/50* (2013.01); *C02F 1/76* (2013.01); *C02F 2303/08* (2013.01); *C02F 2303/20* (2013.01)
USPC ........................................ 548/322.5; 424/661

(58) Field of Classification Search
USPC .................. 424/405, 661, 664, 722
See application file for complete search history.

(56) References Cited

U.S. PATENT DOCUMENTS

| 4,508,697 | A | 4/1985 | Burrus |
| 5,422,126 | A * | 6/1995 | Howarth et al. ............... 424/723 |
| 5,565,109 | A | 10/1996 | Sweeny |
| 6,132,628 | A | 10/2000 | Barak |
| 6,809,205 | B1 * | 10/2004 | Elnagar et al. ............. 548/320.5 |
| 6,995,698 | B2 * | 2/2006 | Suh et al. ........................ 341/68 |
| 7,407,590 | B2 | 8/2008 | Ludensky et al. |
| 2003/0029812 | A1 | 2/2003 | Burns et al. |
| 2007/0178173 | A1 | 8/2007 | Rice et al. |

FOREIGN PATENT DOCUMENTS

| WO | WO2007/078838 A2 | 7/2007 |
| WO | WO2007/089539 A2 | 8/2007 |

OTHER PUBLICATIONS

Huntsman (Catalog on Morpholine, 2005, http://www.huntsman.com/portal/page/portal/performance_products/Media%20Library/a_MC348531CFA3EA9A2E040EBCD2B6B7B06/Products_MC348531D0B9FA9A2E040EBCD2B6B7B06/Amines_MC348531DOBECA9A2E040EBCD2B6B7B06/Morpholine%20%20DGA_R_MC348531D0D20A9A2E040EBCD2B6B7B06/files/morpholine_entire_brochure.pdf).*
GAC Chemical Corp, 2008, http://www.gacchemical.com/feed.php?num=1&news_id=78&feed_id=32.*
Smith, Org. Syn. 1993, 8, 167.*

* cited by examiner

*Primary Examiner* — Sean Basquill
*Assistant Examiner* — Kauser M Akhoon
(74) *Attorney, Agent, or Firm* — Hoffmann & Baron, LLP

(57) ABSTRACT

Disclosed are compositions for stabilizing a source of active halogen in aqueous solution. The compositions comprise (i) at least one substituted N-hydrogen compound, such as 5,5-dimethylhydantoin, and (ii) at least one additional nitrogen compound selected from ammonia, ammonium salts, and nitrogen compounds containing no carbon-hydrogen bonds, the molar ratio of (i) and (ii) being in the range of 50:1 to 0.02:1. Active halogen-containing aqueous solutions stabilized by the above compositions are particularly useful for controlling microbial and planktonic growth in aqueous systems such as process liquids in the pulping or papermaking industry. The compositions are also useful in reducing the corrosivity of halogen-containing solutions.

22 Claims, No Drawings

STABILIZED ACTIVE HALOGEN SOLUTIONS

This application is the U.S. National Phase of, and Applicants claim priority from, International Patent Application Number PCT/EP2010/004568 filed Jul. 26, 2010, and United States Provisional Patent Application bearing Ser. No. 61/228,778 filed Jul. 27, 2009, which are incorporated herein by reference in their entirety.

FIELD OF THE INVENTION

The invention relates to a composition for stabilizing a source of active halogen in aqueous solution. It further relates to an aqueous solution of said composition, a method for stabilizing a source of active halogen in aqueous solution, a stabilized aqueous solution of a source of active halogen, a method for controlling microbial and/or planktonic growth in an aqueous system, and a method for reducing corrosion of metallic parts in contact with an active halogen-containing aqueous system.

BACKGROUND OF THE INVENTION

Oxidants are used in a wide variety of water treatment applications to reduce chemical oxygen demand (COD), increase cleanliness, and/or provide biological control. Such treatment programs are especially useful in papermaking, pulp production, waste water treatment, recreational waters, and recirculating cooling waters. While sodium hypochlorite or chlorine gas can be used as microbicides, the addition of unstabilized free halogen oxidants suffers from inefficiencies generated by various system components or impurities, resulting in an oxidant demand greater than that required for microbial control in the absence of such components. This is due, in part, to the high oxidation potential of free halogens and efficient kinetic pathways for their degradation, resulting in unselective oxidation of various organic and inorganic species and leading to inefficient utilization and the generation of undesirable byproducts. In this regard, the use of organic halogen stabilizers is known to reduce unwanted side reactions and decomposition of free halogens in the presence of sunlight, process additives, paper making furnish components, and other system components, while still providing the desired microbicidal performance.

U.S. Pat. No. 7,407,590 teaches the use of hypochlorite stabilization chemistry using hydantoins for controlling sessile bacterial growth (i.e., biofilm formation) in aquatic systems. The inventors found the method to be more efficacious against sessile bacteria than the free halogen treatments of the prior art. In addition, the method of that invention required less total halogen to achieve biofilm control than other methods involving free halogen treatments. The inventors further found that it is desirable to utilize the most efficient oxidizing halogen programs because oxidizing halogens generate absorbable organic halogen (AOX) in side reactions with organic matter. Limiting the formation of AOX reduces the environmental impact of the treatment.

Another example of a halogen stabilizing technology is described in U.S. Pat. No. 5,565,109, which teaches that selected N-hydrogen compounds, such as 5,5-dimethylhydantoin (DMH), dramatically improve the bactericidal efficacy of hypochlorite solutions in pulp slurries, while significantly reducing the amount of hypochlorite required to achieve biological control. This efficacy enhancement is believed to result from the conversion of free halogen to combined halogen by the N-hydrogen compound, such as DMH, which effectively increases the lifetime of active halogen and its persistence in the presence of organic components and other contaminants. Due to this stabilizing effect, at any given time the residual halogen concentration of a system in a papermaking application is greater than the residual free chlorine when using hypochlorite alone. Another salient feature described was the use of a wide range of molar ratios of hypochlorite to stabilizer compound, ranging from about 0.1:1 to about 10:1. Although the patent teaches the improved stabilization of free chlorine sources, such as sodium hypochlorite, by N-hydrogen compounds in the presence of material exhibiting a free chlorine demand, the patent does not concern itself with synergistic benefits of N-hydrogen compound mixtures upon total chlorine yields for inorganic N-hydrogen compounds, such as ammonium salts, at high $Cl_2$:N molar ratios (e.g, $Cl_2$:$NH_3$>2-3; vide infra).

In addition to the examples above, inorganic N-hydrogen compounds, such as ammonia and its corresponding conjugate acid salts, as well as urea are used for halogen stabilization and microbial control. Ammonia can react with chlorine or hypochlorous acid/hypochlorite systems to form mono-, di-, and trichloramines, depending upon process conditions such as pH. Not to be limited by theory, the latter two forms, dichloramine and trichloramine, can form when chlorine/hypochlorite:N molar ratios are greater than 1:1 and are particularly unstable, decomposing exothermically and fairly rapidly to nitrogen gas and hydrogen chloride in aqueous systems. Depending upon specific system factors, such as alkalinity, this can lead to a dramatic decrease in pH and increased corrosion in some systems. In fact, this instability has been used as a means for ammonia removal in the potable water industry, a process well-known to those skilled in the art as "breakthrough" chlorination.

Similarly, decomposition of urea is usually observed in the presence of excess hypochlorite (i.e., when the NaOCl:urea molar ratio is greater than 2 or, since urea has two nitrogen atoms, the NaOCl:N equivalent ratio is greater than 1). For instance, U.S. Pat. No. 4,508,697 teaches a method whereby the residual oxidant content in a waste hypochlorite process stream is destroyed via the use of urea, the major reaction in the process being:

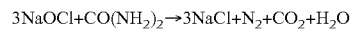

$$3NaOCl + CO(NH_2)_2 \rightarrow 3NaCl + N_2 + CO_2 + H_2O$$

Ultimately, the process described reduces to biological oxygen demand (B.O.D.) of the effluent in order to meet federal EPA guidelines.

Nonetheless, stabilized halogens in the form of monohalamines, such as mono-chloramine, are also known to be effective for both planktonic and sessile bacterial control in a variety of industrial applications, such as pulp and paper applications. According to the prior art, careful control of conditions for mixing the halogen source with the ammonia or ammonium salt source is required. For instance, U.S. Pat. No. 6,132,628 describes a complex system for the careful formation of halamines for treating aqueous systems to inhibit bacterial growth. Key features of the described process method include the dilution of the ammonium salt source to a preferred concentration of 0.1-6.0%, maintaining an oxidant:N molar ratio of less than or equal to 1, although preferably about 1, and maintaining the pH of the biocidal mixture to at least 9.0.

Similarly, patent application WO 2007/089539 A2 and U.S. Patent Application Publication No. 2007/0178173 A1 describe a chemical composition for microbial control in aqueous systems whereby a free chlorine source is combined with urea in a specifically defined molar ratio of chlorine (as $Cl_2$) to urea in the range of 2:1 to 1:2 and an alkali base in order to maintain a pH greater than 10.0. According to the inventors, the presence of the alkali base provided both greater stability as well as improved biocidal efficacy for the given compositional range. However, even at high pH (12.4-13.4) and $Cl_2$:urea ratios of 1:1-2:1, the total halogen yield is only 48-69%.

U.S. Patent Application Publication No. 2003/0029812 A1 teaches a method for controlling the growth of microorganisms or killing microorganisms in aqueous solution via the combination of a free halogen-generating biocide, an N-hydrogen compound stabilizer, and a quaternary ammonium compound or biocidal amine. However, compositions for reducing the impact of vapor phase corrosion and increasing the stability of halogenated inorganic N-hydrogen compounds are not disclosed.

Hence, an important limitation of the use of the ammonia, ammonium salt, and urea systems described above is the strict requirement to maintain specific maximum molar ratios of $Cl_2$:$NH_3$ (1:1 max) or $Cl_2$:urea (2:1 max; corresponding to a 1:1 ratio of $Cl_2$:N). In view of the above, it is an object of the present invention to provide a composition for stabilizing sources of active halogen in aqueous systems wherein a wide range of $Cl_2$:N ratios can be used while maintaining a high bactericidal efficacy, low formation of absorbable organic halogen due to limited reactivity with suspended or dissolved organic impurities, and negligible vapor phase corrosivity.

SUMMARY OF THE INVENTION

According to the present invention, a composition is provided whereby a solution containing at least one selected N-hydrogen compound in combination with at least one additional nitrogen compound, such as ammonia or ammonium salts, and/or urea, can be readily and simply combined with a chlorine source, such as sodium hypochlorite, at total $Cl_2$:$NH_3$ and/or $Cl_2$:urea ratios (expressed as $Cl_2$:N) greater than 1:1, more specifically up to molar ratios of 2:1-60:1, to provide stabilized chlorine solutions and provide for enhanced bactericidal efficacy.

More specifically, the applicants have found that a composition comprising (i) at least one substituted N-hydrogen compound selected from the group consisting of p-toluenesulfonamide, 5,5-dialkylhydantoins, methanesulfonamide, barbituric acid, 5-methyluracil, imidazoline, pyrrolidone, morpholine, acetanilide, acetamide, N-ethyl-acetamide, phthalimide, benzamide, succinimide, N-methylolurea, N-methylurea, acetylurea, methyl allophanate, methyl carbamate, phthalohydrazide, pyrrole, indole, formamide, N-methylformamide, dicyanodiamide, ethyl carbamate, 1,3-dimethylbiuret, methylphenylbiuret, 4,4-dimethyl-2-oxazolidinone, 6-methyluracil, 2-imidazolidinone, ethyleneurea, 2-pyrimidone, azetidin-2-one, 2-pyrrolidone, caprolactam, phenylsulfinimide, phenylsulfinimidylamide, diaryl- or dialkylsulfinimides, isothiazoline-1,1-dioxide, hydantoin, glycine, piperidine, piperazine, ethanolamine, glycinamide, creatine, and glycoluril, and (ii) at least one additional nitrogen compound selected from the group consisting of ammonia, ammonium salts, and nitrogen compounds containing no carbon-hydrogen bonds, in a molar ratio of (i) to (ii) in the range of 50:1 to 0.2:1, can effectively stabilize a source of active halogen in an aqueous solution for use in an industrial water process system.

DETAILED DESCRIPTION OF THE INVENTION

Suitable ammonium salts include, but are not limited to, ammonium sulfate (($NH_4)_2SO_4$), ammonium chloride ($NH_4Cl$), ammonium carbonate (($NH_4)_2CO_3$), and ammonium bromide ($NH_4Br$). Nitrogen compounds containing no carbon-hydrogen bond include both inorganic and organic nitrogen compounds, such as, but not limited to, urea, biuret, boric acid amide, triammonium trisulfimide, orthophosphoryltriamide, cyanuric acid, melamine, cyanamide, sodium triamidometaphosphate, and sulfonamide.

The compositions of the invention can effectively stabilize a source of active halogen in aqueous solution such that the molar ratio of halogen to additional nitrogen compound (ii) is in the range of 100:1 to 0.1:1, preferably in the range of 50:1 to 0.2:1, most preferably in the range of 30:1 to 2:1.

In a preferred embodiment the molar ratio of (i) and (ii) is in the range of 10:1 to 0.1:1, more preferably in the range of 7:1 to 2:1.

The at least one substituted N-hydrogen compound (i) is preferably 5,5-dimethylhydantoin or morpholine.

In preferred embodiments, the additional nitrogen compound (ii) is ammonium sulfate or urea.

Advantageously, the stabilizer composition of the invention in concentrated form contains the at least one substituted N-hydrogen compound (i) in an amount ranging from 0.5% to 35% by weight, preferably from 1% to 20% by weight, and more preferably from 3% to 17% by weight, and the at least one additional nitrogen compound (ii) in an amount ranging from 0.15% to 35% by weight, preferably from 0.3% to 17% by weight, and more preferably from 1% to 12% by weight.

The above composition is expediently used as an aqueous solution having a pH in the range of 3 to 13, preferably in the range of 3 to 11, more preferably in the range of 5 to 10, and most preferably in the range of 7 to 9.5.

For stabilizing a source of active halogen in aqueous solution, said source of active halogen in aqueous solution can be mixed with the above composition.

Alternatively, a source of active halogen in aqueous solution can be stabilized by admixing it with the aforementioned aqueous solution comprising the above composition.

The source of active hydrogen and the aforementioned composition or aqueous solution are preferably mixed such amounts that the molar ratio of halogen (as total $Cl_2$) to additional nitrogen compound (ii) is in the range of 100:1 to 0.1:1.

In a preferred embodiment the source of active halogen source is selected from the group consisting of elemental chlorine, elemental bromine, bromine chloride, an alkali metal hypohalite, an alkaline earth metal hypohalite, a mono- and/or dihalogenated hydantoin, a halogenated cyanurate, a halogenated cyanuric acid, and mixtures of the aforementioned among each other and/or with sodium bromide. Most preferably the source of active halogen source is an alkali metal hypohalite, in particular sodium hypochlorite.

The molar ratio of active halogen source to the total of the at least one substituted nitrogen compound (i) and the at least additional nitrogen compound (ii) is preferably in the range of 50:1 to 0.2:1. More preferably, the molar ratio of active halogen source to the total of the at least one substituted nitrogen compound (i) and at least one additional nitrogen compound (ii) is in the range of 10:1 to 1:1, and most preferably in the range of 6:1 to 2:1.

Also claimed is a stabilized aqueous solution of a source of active halogen, obtainable by the aforementioned methods for stabilizing a source of active halogen in aqueous solution.

In a preferred embodiment of said stabilized aqueous solution the source of active halogen is selected from hypochlorous acid, an alkali metal salt thereof, an alkaline earth metal salt thereof, and mixtures of the aforementioned.

Also claimed is a method for controlling microbial biofilm and/or microbial and/or planktonic growth in an aqueous system, whereby the aforementioned stabilized aqueous solution of a source of active halogen is added to said aqueous system.

In contrast to the teachings of U.S. Pat. No. 6,132,628 and U.S. Patent Application Publication No. 2007/0178173 A1, there is no absolute requirement for complex mixing systems, for reactant dilution, pH control, or for maintaining precise $Cl_2:NH_3$ or $Cl_2$:urea molar ratios, although such dilutions and pH adjustments can be made, if desired or preferred. Hence, solution compositions of the present invention can be used in a method for total halogen stabilization and controlling microbial growth in aqueous systems, such as a paper pulp slurry or cooling tower waters, via direct mixing of a concentrated halogen source, such as a concentrated commercial grade sodium hypochlorite (e.g., 12.2%) with the concentrated solution (e.g., 15-18% concentrate) over a wide range of both $Cl_2:NH_3$ or $Cl_2$:urea molar ratios and $Cl_2$:total stabilizer molar ratios. Not to be limited by theory, $Cl_2$:total stabilizer molar ratios ranging from 2:1-6:1 are considered to be particularly effective. Thus, a particular advantage of the flexibility provided by the present invention allows for straightforward adjustments of the relative amounts of active halogen source and stabilizer composition such that a higher stabilized fraction of the active halogen may be desirable in systems where high halogen demand and/or high biofilm propensity may be present and/or altered accordingly for a low demand situation. This provides an advantage relative to fixed molar ratio products in that the total halogen concentration can be fixed and the degree of stabilization varied (i.e., $Cl_2$:total stabilizer, $Cl_2:NH_3$, and $Cl_2$:urea molar ratios), the total halogen concentration can be varied and the degree of stabilization held fixed, or both can be adjusted.

In addition, the applicants have also found that the compositions and aqueous solutions of the invention can effectively reduce the corrosivity of active halogen-containing aqueous systems. Accordingly, the stabilized halogen containing mixtures described above can also be used in a method for reducing the corrosion of metallic parts, such as tanks, piping, pumps and stirrers, which are in contact with an active halogen-containing aqueous system and/or with the vapor phase above such aqueous system.

Accordingly, the corrosion of metallic parts contacting an active halogen-containing aqueous system and/or the vapor phase above such aqueous system can be reduced by adding to said aqueous system the aforementioned stabilized aqueous solutions.

In a preferred embodiment, the aqueous system wherein microbial and/or planktonic growth is to be controlled and/or corrosion of metallic parts is to be reduced, as described above, is a process liquid in the pulping or papermaking industry.

In the aqueous solutions to be stabilized (use dilution), the method for stabilizing a source of active halogen in aqueous solution, and in the methods for controlling microbial biofilm and/or microbial and/or planktonic growth or reducing corrosion, the stabilizer composition or combination of the stabilizer composition and chlorine source is advantageously diluted to such an extent that the at least one substituted N-hydrogen compound (i) and the at least one additional nitrogen compound (ii) are present in a combined amount in the range of 0.1 to 300 ppm, preferably 0.15 to 100 ppm, more preferably 0.2 to 20 ppm, all concentrations given by weight.

EXAMPLES

The following non-limiting examples will illustrate the invention, but they are not meant to limit the invention in any respect.

Example 1

In order to demonstrate the enhanced stability and flexibility of compositions of the present invention upon combining with a halogen source, a continuous flow system was constructed consisting of a PVDF static mixing "T", stopcocks, and tubing adapters connected to 2 Masterflex® pumps for addition of the sodium hypochlorite solution and corresponding stabilizer sample. For each data point, the combined flow rates of the stabilizer and hypochlorite solutions were adjusted in order to maintain the desired molar ratio of NaOCl to active ingredient (A.I.). The solution temperature was recorded before the onset of flow and after combination with the hypochlorite solution. In addition, the final pH of the resulting collected solution was recorded after a 2 min interval of continuous flow.

Ammonium salt solutions were prepared by addition of the salt to water and adjusting the pH with concentrated NaOH to levels indicated in prior art, but maintaining salt concentrations similar to the levels of compositions of the present invention (pH=9.5-10@15-20% w/w for ammonium salts). Stabilizer solutions of the present invention were prepared via dissolution of at least one substituted N-hydrogen compound (DMH=5,5-dimethylhydantoin and/or Amine=ethanolamine, morpholine) (i), and of at least one additional containing nitrogen compound (ii) in water with the pH adjusted to 7-9.5, if necessary. The resulting solutions were used directly as 15-18% solutions.

Sodium hypochlorite solutions were used directly at high concentration (12.2%). The pH of the hypochlorite solutions were measured as is (pH=12.6) and used as the initial value for the ΔpH determinations.

The enhanced stability of the compositions of the present invention upon mixing with oxidant solution is exemplified in Table 1. Consistent with known ammonia and urea chemistry (vide supra), mixing a halogen source and ammonium salt solutions at $Cl_2$:N ratios greater than 1 (e.g., 2-4) usually results in substantial exothermic temperature excursions (ΔT, in Kelvin) and reductions in pH due to decomposition reactions that occur. In contrast, the compositions of the present invention showed significantly less temperature increase and/or pH reduction, indicating greater stability of the mixtures.

TABLE 1

| Solution | % NaOCl Used | % Active Ingredients | $Cl_2:NH_3$ or $Cl_2$:Urea | ΔT (K) | ΔpH |
| --- | --- | --- | --- | --- | --- |
| $(NH_4)_2SO_4$ | 12.2% | 20% | 4 | 28 | −4.8 |
| " | 12.2% | 15% | 4 | 32 | −4.7 |
| " | 12.2% | 15% | 2 | 23 | −10.4 |
| $NH_4Br$ | 12.2% | 17% | 4 | 34 | −5.3 |
| " | 12.2% | 15% | 4 | 31 | −5.3 |
| " | 12.2% | 15% | 2 | 37 | −9.5 |
| Urea | 12.2% | 15% | 8 | 36 | −0.7 |
| " | 12.2% | 5% | 2.5 | 18 | −0.5 |
| DMH + Amine + $(NH_4)_2SO_4$ | 12.2% | 17% | 9 | 20 | −3.4 |
| " | 12.2% | 17% | 6 | 13 | −3.5 |
| " | 12.2% | 17% | 4 | 9 | −3.3 |
| DMH + $(NH_4)_2SO_4$ | 12.2% | 15% | 5 | 20 | −3.8 |
| " | 12.2% | 15% | 3 | 15 | −5.4 |
| " | 12.2% | 15% | 2 | 9 | −5.4 |
| DMH + Amine + Urea | 12.2% | 18% | 16 | 1 | −0.2 |

TABLE 1-continued

| Solution | % NaOCl Used | % Active Ingredients | $Cl_2:NH_3$ or $Cl_2:Urea$ | ΔT (K) | ΔpH |
|---|---|---|---|---|---|
| " | 12.2% | 18% | 9 | 6 | −0.4 |
| DMH + Urea | 12.2% | 15% | 45 | 2 | −0.1 |
| " | 12.2% | 15% | 30 | 1 | −0.3 |
| " | 12.2% | 15% | 15 | 2 | −0.6 |

Example 2

In addition to reduced temperature excursions and pH changes, increased stabilization of the compositions of the present invention is demonstrated in a manner similar to the above using the same continuous flow system and experimental conditions. DMH and ethanolamine were combined in aqueous solution with ammonium sulfate, while ammonium sulfate was dissolved in water to the desired concentration and the pH adjusted to 9.5. The total yield of the residual % $Cl_2$ upon mixing was analyzed via the DPD reagent method and residual chloramines analyzed using HACH Ammonia TNT Plus® test kits and reported as residual % $NH_3$.

As shown in Table 2, compositions of the present invention show significantly increased halogen stabilization and yield, as well as reduced decomposition of the chloramines formed.

TABLE 2

| Solution | $Cl_2:NH_3$ Molar Ratio | Total Residual $Cl_2$ (% Yield) | Total Residual $NH_3$ (% Yield) |
|---|---|---|---|
| DMH + Amine + $(NH_4)_2SO_4$ | 2.2 | 102 | 80.2 |
| $(NH_4)_2SO_4$ | 2.2 | 18.8 | 4.98 |

Example 3

Compositions of the current invention exhibit enhanced biocidal activity relative to compositions of prior art. The conditions of the experiment were a modification of the method described in ASTM E: 1839-07. A 1% pulp slurry was prepared via shredding white laser printer paper and adding to an appropriate amount of 400 ppm alkalinity (as $CaCO_3$) water solution. The slurry was rapidly mixed while heating to 98(±2)° C., followed by cooling to room temperature. The pH was adjusted to 8.5 with 1N $H_2SO_4$ and the slurry was diluted to 0.5% with deionized water. A 98(±1) mL aliquot was transferred to a 125 mL sample flask and steam sterilized and cooled to room temperature prior to use.

Stock solutions of NaOCl at either 51,000 ppm or 400 ppm (as $Cl_2$) were freshly prepared prior to the organism challenge test. Dilutions of the test samples were made in order to prepare a sample solution at the desired $Cl_2$:Active Ingredient molar ratio and the flasks were dosed according to the target total $Cl_2$ desired (2 ppm total $Cl_2$).

Twenty four hour cultures of *Enterobacter aerogenes* (ATCC 13048) and *Pseudomonas aeruginosa* (ATCC 15442) were used for the testing. Microbiological counts were performed using tryptic soy agar (TSA) slants by known pour plate techniques. Final bacterial concentration of the inoculum was between $2 \times 10^6$ and $1 \times 10^7$ CFU/mL. 1 mL of the inoculum was then placed into each of the sample to be tested and the samples placed onto a shaker for 3 hours at 34° C. After the 3 hour contact time, DIFCO Dey-Engley (D/E) Neutralizing Broth was used as the first serial dilution tube for biocide neutralization and dilutions were plated through $10^6$.

The efficacies are given as Δlg values corresponding to the difference of the common logarithms of the bacterial counts (in CFU/mL) obtained without stabilizer and those obtained with addition of stabilizer, such that:

$$\Delta lg = lg[\text{Bacterial Counts (CFU/mL)}]_{reference} - lg[\text{Bacterial Counts (CFU/mL)}]_{stabilized\ sample}$$

Hence, a higher Δlg value indicates increased biocidal activity of the composition.

Results of testing of examples of formulations based on compositions of the present invention where the additional nitrogen compound (ii) is an ammonium salt, such as ammonium sulfate, in fine paper pulp slurry are shown in Table 3.

TABLE 3

| Sample | DMH (ppm) | $(NH_4)_2SO_4$ (ppm) | $DMH:NH_3$ Molar Ratio | $Cl_2:NH_3$ Molar Ratio | Efficacy (Δlg) |
|---|---|---|---|---|---|
| DMH + $(NH_4)_2SO_4$ | 0.89 | 0.45 | 1.0 | 4.1 | 3.6 |
| " | 0.60 | 0.62 | 0.5 | 3.0 | 4.8 |
| " | 0.30 | 0.75 | 0.2 | 2.5 | 5.9 |
| DMH | 1.81 | — | — | — | 3.2 |

Similarly, Table 4 shows test results of examples of formulations based on compositions of the present invention where the additional nitrogen compound is urea, tested in fine paper pulp slurry.

TABLE 4

| Sample | DMH (ppm) | Urea (ppm) | DMH:Urea Molar Ratio | $Cl_2$:Urea Molar Ratio | Efficacy (Δlg) |
|---|---|---|---|---|---|
| DMH + Urea | 1.57 | 0.11 | 6.7 | 15.4 | 3.6 |
| " | 1.18 | 0.29 | 1.9 | 5.8 | 4.4 |
| " | 0.87 | 0.44 | 0.93 | 3.8 | 5.5 |
| DMH | 1.81 | — | — | — | 2.9 |

Table 5 shows test results of examples of formulations based on compositions of the present invention where the additional nitrogen compound (ii) is an ammonium salt, such as ammonium sulfate, tested in box paper pulp slurry.

TABLE 5

| Sample | DMH (ppm) | $(NH_4)_2SO_4$ (ppm) | $DMH:NH_3$ Molar Ratio | $Cl_2:NH_3$ Molar Ratio | Efficacy (Δlg) |
|---|---|---|---|---|---|
| DMH + $(NH_4)_2SO_4$ | 0.89 | 0.45 | 1.0 | 4.1 | 0.6 |
| " | 0.60 | 0.62 | 0.5 | 3.0 | 1.2 |
| " | 0.30 | 0.75 | 0.2 | 2.5 | 2.4 |
| DMH | 1.81 | — | — | — | 0.1 |

Hence, solutions comprising compositions of at least one substituted N-hydrogen compound and of at least one additional nitrogen compound (ii) exhibit greater enhancement of the microbiological efficacy of a halogen source relative to a single composition containing a substituted N-hydrogen compound, such as 5,5-dimethylhydantoin (DMH).

Example 4

Vapor Phase Corrosion

The potential vapor phase corrosivity of examples of the proposed formulations was evaluated according to the following procedure: Q-Panel® Type S coupons (available from Q-Lab, Cleveland, Ohio) of 10.16 cm×15.24 cm×0.81 cm (4"×6"×0.032"), AISI plain C1010 steel (dull matte side: 0.65-1.65 μm (25-65 micro-inches) roughness; ground side: 0.50-1.15 μm (20-45 micro-inches) roughness) were rinsed with deionized water and dried with paper towels and placed into 4 L beakers. A test solution was prepared by dissolving sodium bicarbonate in deionized water to obtain 400 ppm alkalinity (as $CaCO_3$) and adjusting the solution pH to 8.0 using 1.0 N NaOH or 1.0 N HCl as required. 250 mL of this solution was added to a 400 mL beaker and subsequently dosed 2 ppm total $Cl_2$ for each example formulation composition. Each beaker of solution was placed in a separate 4 L beaker, along with a carbon steel coupon, and the 4 L beaker covered with a plastic film and placed in an oven at 37° C. for a total of 5 days. Each 250 mL solution was replaced with freshly prepared samples on day 2 of the study. Coupon corrosion was assessed visually, photographed, and ranked as function of the percent of surface oxidation at 2 days and at 5 days. The test results are shown in Table 6.

TABLE 6

| Sample | DMH (ppm) | $(NH_4)_2SO_4$ (ppm) | % Surface Oxidation 2 days | 5 days |
|---|---|---|---|---|
| DMH + $(NH_4)_2SO_4$ | 0.89 | 0.45 | 10 | 35 |
| " | 0.60 | 0.62 | 40 | 80 |
| " | 0.30 | 0.75 | 30 | 90 |
| DMH | 1.81 | — | 0 | 15 |
| $(NH_4)_2SO_4$ | — | 0.93 | 50 | 100 |

The invention claimed is:

1. A composition for stabilizing a source of active halogen in aqueous solution for use in an industrial water process system, said composition comprising:
   (i) at least one substituted N-hydrogen compound selected from the group consisting of p-toluenesulfonamide, 5,5-dialkylhydantoins, methanesulfon-amide, barbituric acid, 5-methyluracil, imidazoline, pyrrolidone, morpholine, acetanilide, acetamide, ΛAethylacetamide, phthalimide, benzamide, succin-imide, /V-methylolurea, ΛAmethylurea, acetylurea, methyl allophanate, methyl carbamate, phthalohydrazide, pyrrole, indole, formamide, /V-methyl-formamide, dicyanodiamide, ethyl carbamate, 1,3-dimethylbiuret, methyl-phenylbiuret, 4,4-dimethyl-2-oxazolidinone, 6-methyluracil, 2-imidazoli-dinone, ethyleneurea, 2-pyrimidone, azetidin-2-one, 2-pyrrolidone, capro-lactam, phenylsulfinimide, phenylsulfinimidylamide, diaryl- or dialkylsulfin-imides, isothiazoline-1,1-dioxide, hydantoin, glycine, piperidine, piperazine, ethanolamine, glycinamide, creatine, and glycoluril, and
   (ii) at least one additional nitrogen compound selected from the group consisting of ammonia, ammonium salts, and nitrogen compounds containing no carbon-hydrogen bonds,
in a molar ratio of (i) to (ii) in the range of 50:1 to 0.02:1.

2. The composition of claim 1, wherein the molar ratio (i) to (ii) is in the range of 10:1 to 0.1:1.

3. The composition of claim 2, wherein the molar ratio (i) to (ii) is in the range of 7:1 to 2:1.

4. The composition of any of claim 1, wherein the substituted N-hydrogen compound is 5,5-dimethylhydantoin.

5. The composition of claim 1, wherein the substituted N-hydrogen compound is morpholine.

6. The composition of claim 1 wherein the additional nitrogen compound is ammonium sulfate.

7. The composition of claim 1 wherein the additional nitrogen compound is urea.

8. An aqueous solution comprising the composition of claim 1, wherein the pH of the solution is in the range of 3 to 13.

9. The aqueous solution of claim 8, wherein the pH of the solution is in the range of 3 to 11.

10. The aqueous solution of claim 9, wherein the pH of the solution is in the range of 5 to 10.

11. The aqueous solution of claim 10, wherein the pH of the solution is in the range of 7 to 9.5.

12. A method for stabilizing a source of active halogen in aqueous solution, said method comprising the step of mixing said source of active halogen in aqueous solution with the composition or aqueous solution of claim 1.

13. The method of claim 12, wherein the molar ratio of halogen, determined as total Cb, to additional nitrogen compound (ii) is in the range of 100:1 to 0.1:1.

14. The method of claim 12, wherein the source of active halogen source is selected from the group consisting of elemental chlorine, elemental bromine, bromine chloride, an alkali metal hypohalite, an alkaline earth metal hypohalite, a mono- and/or dihalogenated hydantoin, a halogenated cyanurate, a halogenated cyanuric acid, and mixtures of the aforementioned among each other and/or with sodium bromide.

15. The method of claim 12, wherein the molar ratio of active halogen source to the total of the at least one substituted N-hydrogen compound (i) and at least one additional nitrogen compound (ii) is in the range of 50:1 to 0.2:1.

16. The method of claim 15, wherein the molar ratio of active halogen source to the total of the at least one substituted N-hydrogen compound (i) and at least additional nitrogen compound (ii) is in the range of 10:1 to 1:1.

17. The method of claim 16, wherein the molar ratio of active halogen source to the total of the at least one substituted N-hydrogen compound (i) and at least one additional nitrogen compound (ii) is in the range of 6:1 to 2:1.

18. A stabilized aqueous solution of a source of active halogen, obtainable according to the method of any of claim 12.

19. The stabilized aqueous solution of claim 18, wherein the source of active halogen is hypochlorous acid, an alkali metal salt thereof, an alkaline earth metal salt thereof, or a mixture of the aforementioned.

20. A method for controlling microbial biofilm and/or microbial and/or planktonic growth in an aqueous system, said method comprising adding to said aqueous system the stabilized aqueous solution of claim 18.

21. A method for reducing corrosion of metallic parts contacting an active halogen-containing aqueous system and/or the vapor phase above such aqueous system, said method comprising adding to said aqueous system the stabilized aqueous solution of claim 18.

22. The method of claim 20, wherein the aqueous system is a process liquid in the pulping or papermaking industry.

* * * * *